(12) United States Patent
SooHoo

(10) Patent No.: US 12,467,581 B2
(45) Date of Patent: Nov. 11, 2025

(54) ARTICULATED ARM WITH RAMPED UNLOCKING AND LOCKING MECHANISM

(71) Applicants: The Regents of the University of California, Oakland, CA (US); Department of Veterans Affairs, Washington, DC (US); Nelson SooHoo, Los Angeles, CA (US)

(72) Inventor: Nelson SooHoo, Los Angeles, CA (US)

(73) Assignees: The Regents of the University of California, Oakland, CA (US); Department of Veterans Affairs, Washington, DC (US)

( * ) Notice: Subject to any disclaimer, the term of this patent is extended or adjusted under 35 U.S.C. 154(b) by 19 days.

(21) Appl. No.: 18/570,255

(22) PCT Filed: Jun. 14, 2022

(86) PCT No.: PCT/US2022/033364
§ 371 (c)(1),
(2) Date: Dec. 14, 2023

(87) PCT Pub. No.: WO2022/266050
PCT Pub. Date: Dec. 22, 2022

(65) Prior Publication Data
US 2024/0271743 A1 Aug. 15, 2024

Related U.S. Application Data

(60) Provisional application No. 63/210,200, filed on Jun. 14, 2021.

(51) Int. Cl.
*F16M 11/14* (2006.01)

(52) U.S. Cl.
CPC ....... *F16M 11/14* (2013.01); *F16M 2200/021* (2013.01); *F16M 2200/06* (2013.01)

(58) Field of Classification Search
CPC ............ F16M 11/14; F16M 2200/021; F16M 2200/06; F16M 2200/022; A61B 90/50; A61B 2090/508; F16C 11/106
USPC ........................................................ 248/276.1
See application file for complete search history.

(56) References Cited

U.S. PATENT DOCUMENTS

| | | | | |
|---|---|---|---|---|
| 3,910,538 A | * | 10/1975 | Baitella | F16M 11/14 403/56 |
| 4,320,884 A | * | 3/1982 | Leo | F16M 11/2078 403/56 |
| 4,431,329 A | * | 2/1984 | Baitelle | F16M 11/14 403/55 |
| 4,491,435 A | * | 1/1985 | Meier | F16M 11/2078 403/56 |
| 5,092,551 A | * | 3/1992 | Meier | F16M 11/14 403/56 |

(Continued)

*Primary Examiner* — Christopher Garft
(74) *Attorney, Agent, or Firm* — Riverside Law LLP

(57) ABSTRACT

The present invention relates to articulated arm devices with ramped unlocking and locking mechanisms. The articulated arm devices comprise hinge joints and ball joints that can be locked to position tools or instruments in place in three-dimensional space. Ramped unlocking and locking mechanisms are provided to unlock and lock the hinge joints and ball joints such that articulated arm devices can be rapidly repositioned in three-dimensional space and locked without collapsing.

15 Claims, 6 Drawing Sheets

(56) References Cited

U.S. PATENT DOCUMENTS

| | | | | |
|---|---|---|---|---|
| 6,575,653 B1 * | 6/2003 | Krauter | ................ | A61G 13/101 |
| | | | | 403/55 |
| 2011/0028992 A1 * | 2/2011 | Geiger | .................. | A61B 90/50 |
| | | | | 606/130 |
| 2017/0276291 A1 * | 9/2017 | Subratie | ................ | F16M 13/02 |

* cited by examiner

| | Calculated or Spec | Measured Unit1 | Measured Unit2 |
|---|---|---|---|
| Joint 2 test (with 60 in-lbf torque on Knob) | 17 lbf (min) | >20 lbf | 16.49 lbf** |
| Joint 3 test (with 60 in-lbf torque on Knob) | 17 lbf (min) | 18 lbf | >23.8 lbf*** |
| Lever Squeeze Force (with 60 in-lbf torque on Knob) | 20.58 (Calc) 24.95 lbf (Spec)* | 37.0 lbf | 39.6 lbf |

ARTICULATED ARM WITH RAMPED UNLOCKING AND LOCKING MECHANISM

CROSS-REFERENCE TO RELATED APPLICATIONS

This application is a 35 U.S.C. § 371 National Phase Application claiming priority to International Application No. PCT/2022/033364, filed Jun. 14, 2022, which claims priority to U.S. Provisional Patent Application No. 63/210,200 filed Jun. 14, 2021, each of which is incorporated herein by reference in its entirety.

BACKGROUND OF THE INVENTION

Articulated arms are widely used to stably position and aim tools and instruments in three-dimensional space. Their applications span several fields, including but not limited to surgery, photography, film, sound recording, photonics, and the like. However, existing designs rely on manual rotation of knobs to apply a friction lock on arm hinges. Manual rotation is cumbersome and imprecise. When applying a rotational force to lock an arm in place, the arm itself may be jostled out of its desired position, requiring further steps of unlocking and locking until ideal placement is achieved. Repeated manual locking and relocking can be fatiguing and time consuming.

Thus, there is a need in the art for improved mechanisms for quick and precise locking and relocking of articulated arms. The present invention meets this need.

SUMMARY OF THE INVENTION

In one aspect, the present invention relates to an articulated arm device, comprising: a first arm connected to a ball joint at a first end and a central hinge at a second end; a second arm connected to a ball joint at a first end and the central hinge at a second end; a knob configured to lock and unlock the central hinge; and a ramped unlocking and locking mechanism connected to the central hinge; wherein the ramped unlocking and locking mechanism is configured to toggle between an unlocked and a locked position of the central hinge in a ramped manner.

In one embodiment, the knob is configured to simultaneously lock and unlock the central hinge, the ball joint of the first arm, and the ball joint of the second arm. In one embodiment, the ramped unlocking and locking mechanism is configured to unlock and lock the central hinge, the ball joint of the first arm, and the ball joint of the second arm in a ramped manner.

In one embodiment, the central hinge rotates about a hinge pin, wherein the hinge pin comprises at least one hinge brake movable along the hinge pin, at least one ball bearing ramp rotatable about the hinge pin, and at least one bearing washer movable along the hinge pin. In one embodiment, the ramped unlocking and locking mechanism comprises an actuatable member mechanically linked to the at least one ball bearing ramp, such that actuating the actuatable member proportionally rotates the at least one ball bearing ramp. In one embodiment, the actuatable member is selected from the group consisting of: levers, triggers, sliders, and twist grips.

In one embodiment, the at least one ball bearing ramp comprises a circular arrangement of ramps, each ramp formed by a sloped groove having a lowered position at a bottom of the sloped groove and a raised position at the top of the sloped groove. In one embodiment, the at least one bearing washer comprises a circular arrangement of ball bearings, each ball bearing matched to a ramp of the at least one ball bearing ramp.

In one embodiment, rotation of the at least one ball bearing ramp is configured to guide a ball bearing between the lowered position at the bottom of the sloped groove and the raised position at the top of the sloped groove in a ramped manner, thereby moving the at least one bearing washer along the hinge pin in a ramped manner.

In one embodiment, the movement of the at least one bearing washer along the hinge pin in a ramped manner also moves the at least one hinge brake along the hinge pin in a ramped manner, such that the central hinge is locked and unlocked in a ramped manner. In one embodiment, the movement of the at least one bearing washer along the hinge pin in a ramped manner also moves the at least one ball joint brake along the hinge pin in a ramped manner, such that the ball joint of a respective arm is locked and unlocked in a ramped manner.

In one embodiment, the ramped unlocking and locking mechanism comprises a return mechanism configured to apply a spring force biased to return the ramped unlocking and locking mechanism to a locked or unlocked configuration. In one embodiment, the return mechanism is selected from the group consisting of: springs, coils, hydraulic pistons, pneumatic pistons, elastic members, bendable members, and magnetic members. In one embodiment, the return mechanism comprises an adjustment member configured to adjust a spring force level. In one embodiment, the adjustment member is selected from the group consisting of: screws, dials, ratchets, release valves, and pressure valves.

In one embodiment, locking the central hinge, the ball joint of the first arm, and the ball joint of the second arm locks the articulated arm device in place in three-dimensional space. In one embodiment, unlocking the central hinge, the ball joint of the first arm, and the ball joint of the second arm in a ramped manner is configured to permit repositioning of the articulated arm device with the application of a force while maintaining an instant three-dimensional position of the articulated arm without collapsing.

In one embodiment, the actuatable member is configured to result in ramped locking of the central hinge, the ball joint of the first arm, and the ball joint of the second arm locks the articulated arm device in place in three-dimensional space.

In one embodiment, the actuatable member is configurable to toggle between resulting ramped locking and ramped unlocking of the central hinge, the ball joint of the first arm, and the ball joint of the second arm locks the articulated arm device in place in three-dimensional space.

In one embodiment, the articulated arm device comprises one or more sensors for accurate position, placement and/or orientation of the arm in three-dimensional space.

BRIEF DESCRIPTION OF THE DRAWINGS

The following detailed description of exemplary embodiments of the invention will be better understood when read in conjunction with the appended drawings. It should be understood, however, that the invention is not limited to the precise arrangements and instrumentalities of the embodiments shown in the drawings.

DETAILED DESCRIPTION

Figure 1:
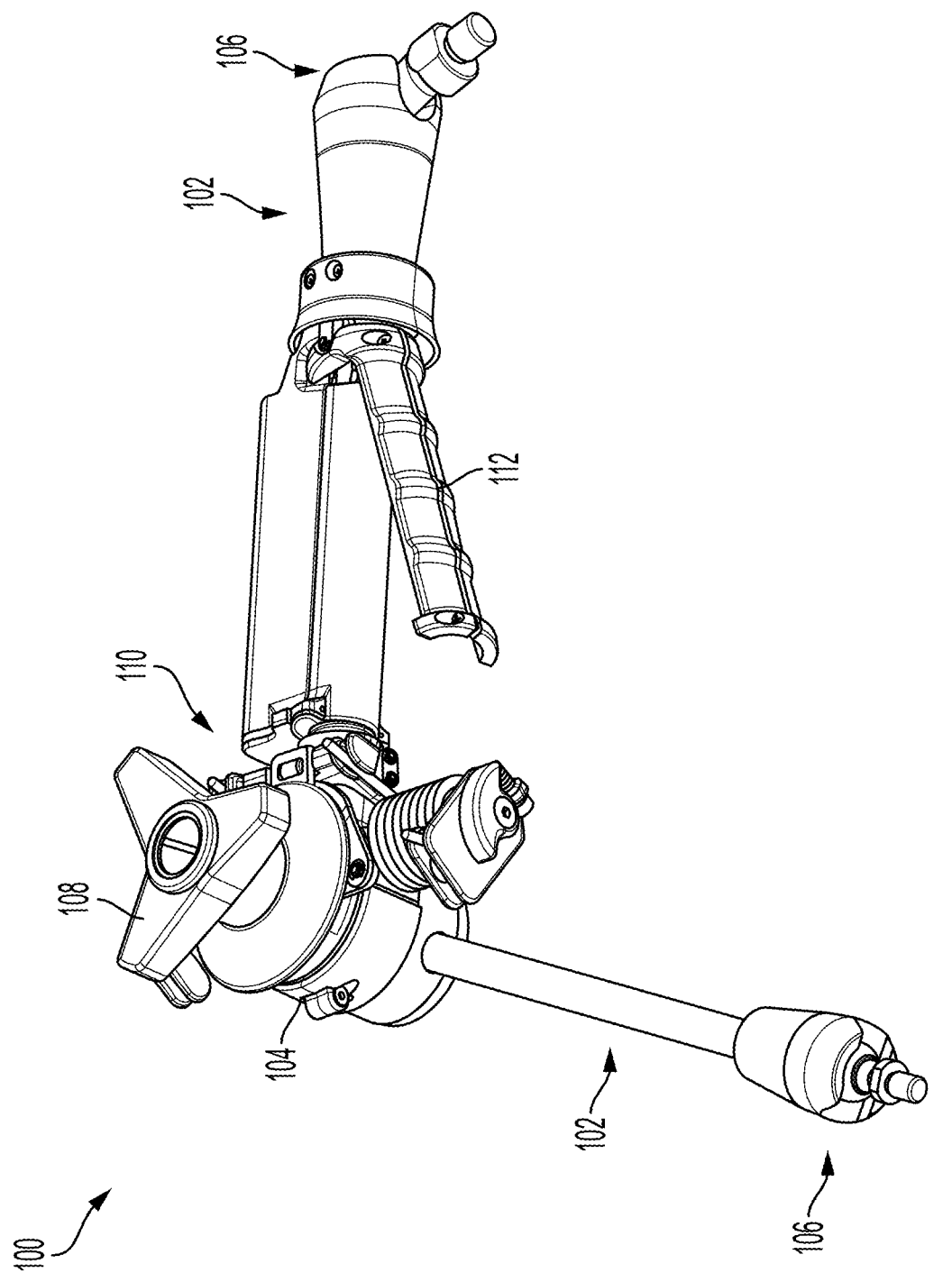
FIG. 1 depicts a perspective view of an exemplary articulated arm and ramped unlocking and locking mechanism.

The present invention relates to articulated arm devices with ramped unlocking and locking mechanisms. The articulated arm devices comprise hinge joints and ball joints that can be locked to position tools or instruments in place in three-dimensional space. Ramped unlocking and locking mechanisms are provided to unlock and lock the hinge joints and ball joints such that articulated arm devices can be rapidly repositioned in three-dimensional space and locked without collapsing.

Definitions

It is to be understood that the figures and descriptions of the present invention have been simplified to illustrate elements that are relevant for a clear understanding of the present invention, while eliminating, for the purpose of clarity, many other elements typically found in the art. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined elsewhere, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6, and any whole and partial increments there between. This applies regardless of the breadth of the range.

Articulated Arm with Ramped Unlocking and Locking Mechanism

Provided herein are articulated arm devices having lockable hinges and ball joints combined with ramped unlocking and locking mechanisms that can unlock and lock the hinges and ball joints in a ramped manner. The articulated arm devices are configured to attach to a stable base at a first end and to a tool or instrument at a second end, such that the tool or instrument can be positioned in three-dimensional space and locked in place by locking the hinges and ball joints. The ramped unlocking and locking mechanisms permit rapid unlocking and locking of the hinges and ball joints, such that the tool or instrument can be rapidly repositioned in three-dimensional space. The ramped unlocking and locking mechanisms modulate the level of unlocking in a ramped manner. Accordingly, the ramped unlocking and locking mechanism also enables the repositioning of the hinges and ball joints with the application of a force while maintaining an instant three-dimensional position of the articulated arms without collapsing.

Referring now to FIG. 1, an exemplary articulated arm 100 and ramped unlocking and locking mechanism 110 are depicted. Articulated arm 100 comprises two arms 102 connected to each other at a central hinge 104, wherein each arm 102 extends in peripheral directions and terminates in a ball joint connector 106. In various embodiments, hinge 104 can be rotatable at least 180° and up to 360° about a single axis, such as a hinge joint rotatable about a pin or a screw. Hinge 104 is configured to be rotatably lockable using knob 108, wherein loosening knob 108 to unlock hinge 104 permits unrestricted rotation in hinge 104 while tightening knob 108 to lock hinge 104 prevents all movement in hinge 104. Ramped unlocking and locking mechanism 110 is integrated into hinge 104 and is configured to unlock and lock hinge 104 in a ramped manner. In other words, ramped unlocking and locking mechanism 110 is configured to transition hinge 104 between a fully locked state to a fully unlocked state through intermediate states in a ramped manner. Where a fully locked state applies a friction lock on hinge 104 that cannot be overcome with a force, and where a fully unlocked state applies no friction on hinge 104 such that hinge 104 may freely rotate about its single axis, an intermediate state applies a friction lock on hinge 104 that is less than that of the fully locked state. Accordingly, while arm 100 may continue to maintain its three-dimensional position in an intermediate state, a force that overcomes the intermediate friction lock may be applied on arm 100 to move and reposition the arm 100. For example, actuating lever 112 is configured to unlock a locked hinge 104 by a proportional amount, such that varying the amount of actuation in lever 112 accordingly varies the frictional lock on hinge 104. In some embodiments, actuating lever 112 is configured to lock an unlocked hinge 104 by a proportional amount. In some embodiments, actuating lever 112 is configured to toggle between unlocking a locked hinge 104 or locking an unlocked hinge 104 by a proportional amount. In some embodiments, ramped unlocking and locking mechanism 110 is configured to directly rotate knob 108 when actuating lever 112. In some embodiments, ramped unlocking and locking mechanism 110 modulates the frictional lock that knob 108 applies to hinge 104. While ramped unlocking and locking mechanism 110 is depicted as being activated by a lever 112, it should be understood that any actuatable member may be used, including but not limited to triggers, sliders, twist grips, and the like.

As would be understood by persons having ordinary skill in the art, ball joint connector 106 comprises a ball joint formed from a ball and socket, wherein the ball is configured to be rotatable in place by 360°, and wherein the ball is configured to be directed in any direction relative to the socket by at least 180°. In some embodiments, knob 108 simultaneously locks hinge 104 and one or both of the ball joint connectors 106, wherein locking a ball joint connector 106 prevents all movement, including both rotation in place as well as directional movement relative to the socket. In some embodiments, knob 108 is configured to selectively lock only hinge 104, only one or both ball joint connectors 106, or hinge 104 and one or both ball joint connectors 106. In some embodiments, ramped unlocking and locking mechanism 110 is configured to simultaneously modulate locking and unlocking in hinge 104 and one or both of the ball joint connectors 106 in a ramped manner. For example, actuating lever 112 is configured to also unlock and lock one or both of the ball joint connectors 106 by a proportional amount, such that varying the amount of actuation in lever 112 accordingly varies a force required to unlock and lock one or both of the ball joint connectors 106. In some embodiments, knob 108 can selectively lock only hinge 104, only one or both ball joint connectors 106, or hinge 104 and one or both ball joint connectors 106. In some embodiments, ramped unlocking and locking mechanism 110 is configured to selectively modulate locking and unlocking in only hinge 104, only one or both ball joint connectors 106, or hinge 104 and one or both ball joint connectors 106.

Figure 2:
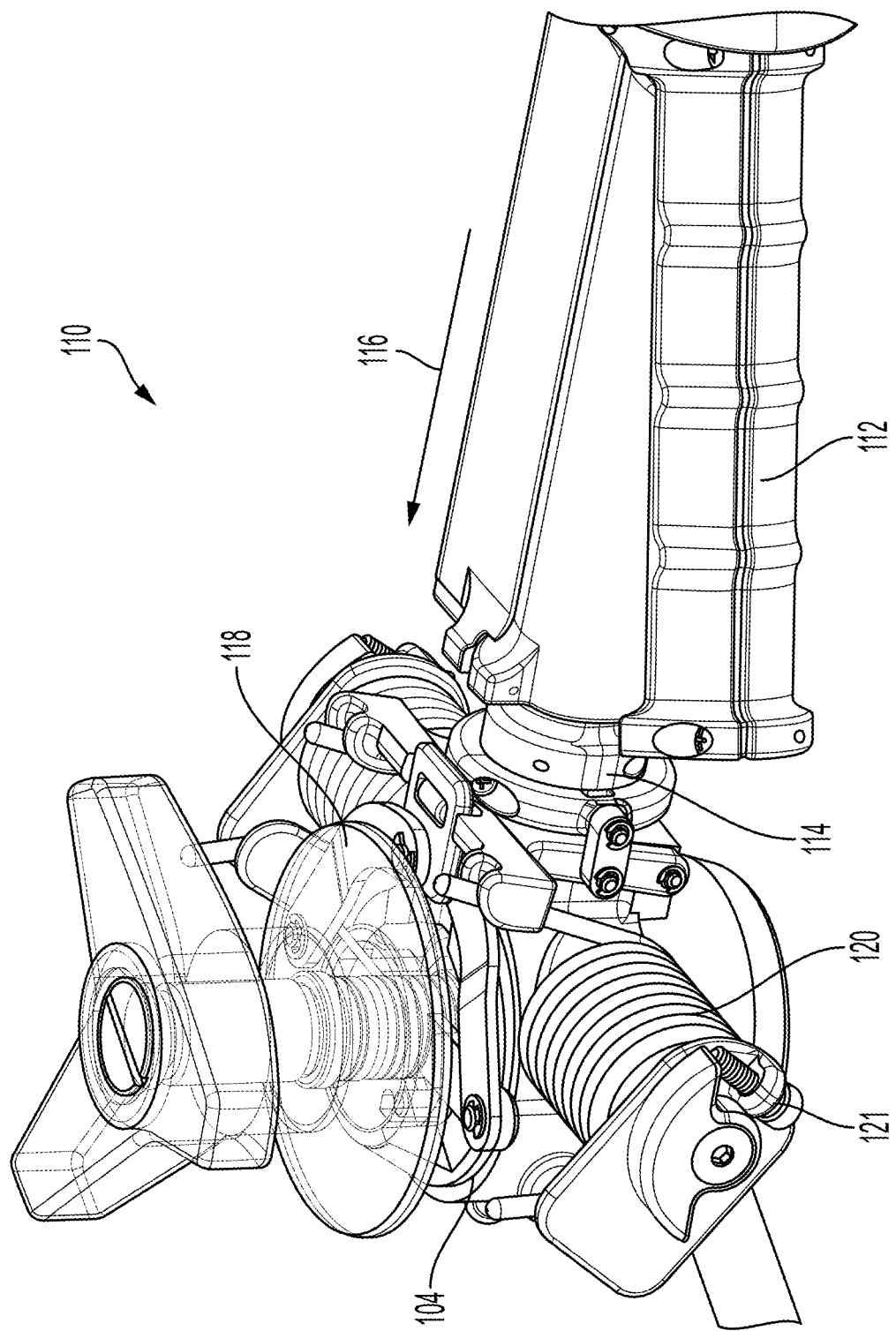
FIG. 2 depicts a magnified view of a hinge of an exemplary articulated arm and ramped unlocking and locking mechanism. The hinge is depicted as partially transparent to show additional ramped unlocking and locking mechanism components.
Figure 3:
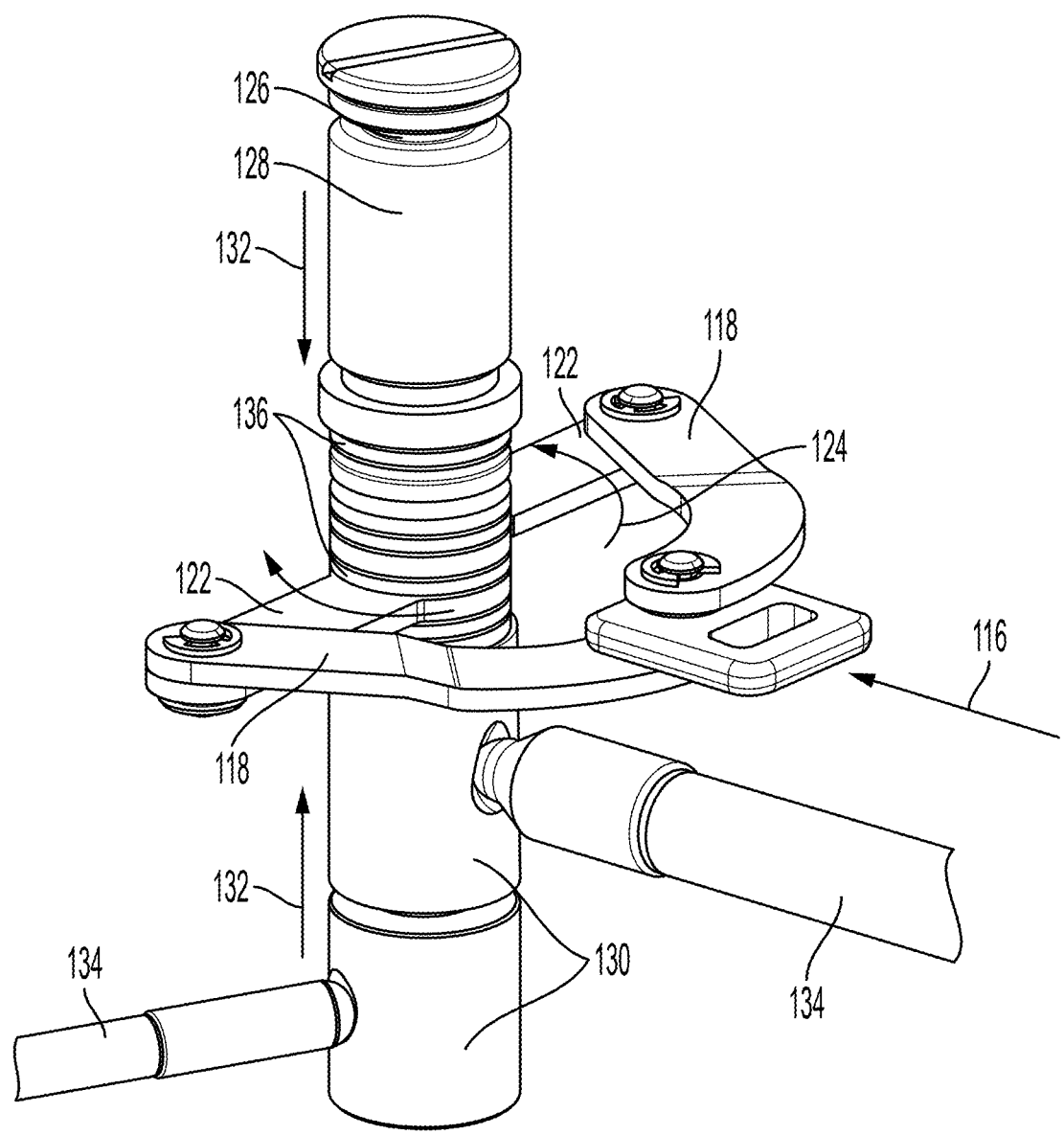
FIG. 3 depicts a perspective view of exemplary ramped unlocking and locking mechanism components in isolation.

Referring now to FIG. 2 and FIG. 3, ramped unlocking and locking mechanism 110 is described in detail. Ramped unlocking and locking mechanism 110 comprises lever 112 mechanically linked to rods 118 by a sheath 114, wherein actuating and releasing lever 112 accordingly actuates sheath 114 and rods 118 in lateral directions 116. It should be understood that movement in lateral directions 116 refers to both movement towards hinge 104 as well as movement away from hinge 104. For demonstration purposes, lateral direction 116 is depicted and described herein as moving towards hinge 104 to unlock articulated arm in a ramped manner.

In various embodiments, a return mechanism 120 is provided to return lever 112, sheath 114, and rods 118 to the resting position depicted in FIG. 2. In other words, return mechanism 120 is biased to return articulated arm 100 to a locked or unlocked configuration. For example, FIG. 2 depicts an exemplary return mechanism 120 connected to a mechanical link between sheath 114 and rods 118, wherein return mechanism 120 applies a spring force against sheath 114 (and accordingly lever 112). Contemplated return mechanisms 120 include but are not limited to springs, coils, hydraulic pistons, pneumatic pistons, elastic members, bendable members, magnetic members, and the like. In certain embodiments, ramped unlocking and locking mechanism 110 comprises an adjustment member 121 configured to adjust the amount or level of spring force in return mechanism 120. For example, FIG. 2 depicts an adjustment member 121 comprising a screw abutting an end of a wound coil, wherein driving the screw adjusts the degree of winding in the coil and thereby adjusts the amount of spring force in the coil. Contemplated adjustment members 121 include but are not limited to screws, dials, ratchets, release valves, pressure valves, and the like.

FIG. 3 depicts hinge pin 126 in isolation, wherein hinge 104 rotates about hinge pin 126. Hinge pin 126 comprises one or more ball bearing ramps 122, one or more bearing washer 136, at least one hinge brake 128, and at least one ball joint brake 130. Each ball bearing ramp 122 is rotatably engaged to hinge pin 126 at a first end and hingedly connected to rods 118 at an opposing second end. Accordingly, actuating lever 112 to move rods 118 in a lateral direction 116 induces movement in each ball bearing ramp 122 in rotational direction 124. Each bearing washer 136 is also engaged to hinge pin 126. In certain embodiments, one or more bearing washer 136 may be engaged to hinge pin 126 such that bearing washer 136 may only translate in vertical directions 132 along hinge pin 126 and is unable to rotate about hinge pin 126. Each of the hinge brakes 128 and ball joint brakes 130 is a cylindrical member engaged to hinge pin 126 and is translatable in vertical directions 132 along hinge pin 126, wherein each of the hinge brakes 128 locks hinge 104 and each of the ball joint brakes 130 locks a ball joint connector 106 by way of a braking rod 134.

In a ramped unlocking configuration, articulated arm 100 is initially locked. Articulated arm 100 can be locked by knob 108 such that each of the hinge brakes 128 and ball joint brakes 130 are translated to a locked position along hinge pin 126. Rotating a ball bearing ramp 122 shifts one or more adjacent bearing washer 136 in a vertical direction 132 in a ramped manner, which in turn shifts one or more of the hinge brakes 128 and ball joint brakes 130 in a vertical direction 132 in a ramped manner out of their respective locked positions, leading to modulation of movement in hinge 104 and/or ball joint connector 106, respectively. Here, as above, it should be understood that movement in lateral directions 116 refers to both movement towards hinge 104 as well as movement away from hinge 104, movement in rotational directions 124 refers to both clockwise and counterclockwise directions, and movement in vertical directions 132 refers to both movement towards a superior end of hinge pin 126 as well as movement towards an inferior end of hinge pin 126. For demonstration purposes, lateral direction 116 is depicted and described herein as moving towards hinge 104 to unlock articulated arm in a ramped manner, and rotational direction 124 and vertical direction 132 are depicted and described herein as moving relative to a specific component to unlock articulated arm in a ramped manner.

In a ramped locking configuration, articulated arm 100 is initially unlocked. A locked position may be initially set by rotating knob 108 while lever 112 is actuated, whereupon releasing lever 112 unlocks articulated arm 100 and further actuation of lever 112 locks articulated arm 100 in a ramped manner. Accordingly, ball bearing ramp 122 and bearing washer 136 are positioned such that each of the hinge brakes 128 and ball joint brakes 130 are placed in an unlocked position along hinge pin 126. Rotating a ball bearing ramp 122 shifts one or more adjacent bearing washer 136 in a vertical direction 132 in a ramped manner, which in turn shifts one or more of the hinge brakes 128 and ball joint brakes 130 in a vertical direction 132 in a ramped manner out of their respective unlocked positions and towards their respective locked positions, leading to modulation of movement in hinge 104 and/or ball joint connector 106, respectively. In some embodiments, the movement and translation of components from unlocked configurations to locked configurations is opposite to those movements and translations of components from locked configurations to unlocked configurations as described elsewhere herein.

In some embodiments, articulated arm 100 further comprises a physical switch configured to toggle ramped unlocking and locking mechanism 110 between a ramped locking mode and a ramped unlocking mode. For example, FIG. 2 depicts ramped unlocking and locking mechanism 110 in an unlocking mode, wherein articulated arm 100 is initially locked and return mechanism 120 is biased to return articulated arm 100 to a locked configuration. Actuating lever 112 pushes against return mechanism 120 in order to unlock articulated arm 100 in a ramped manner. A switch can toggle ramped unlocking and locking mechanism 110 to a locking mode, wherein articulated arm 100 is initially unlocked and return mechanism 120 is biased to return articulated arm 100 to an unlocked configuration. Actuating lever 112 can pull against return mechanism 120 in order to lock articulated arm 100 in a ramped manner.

Figure 4:
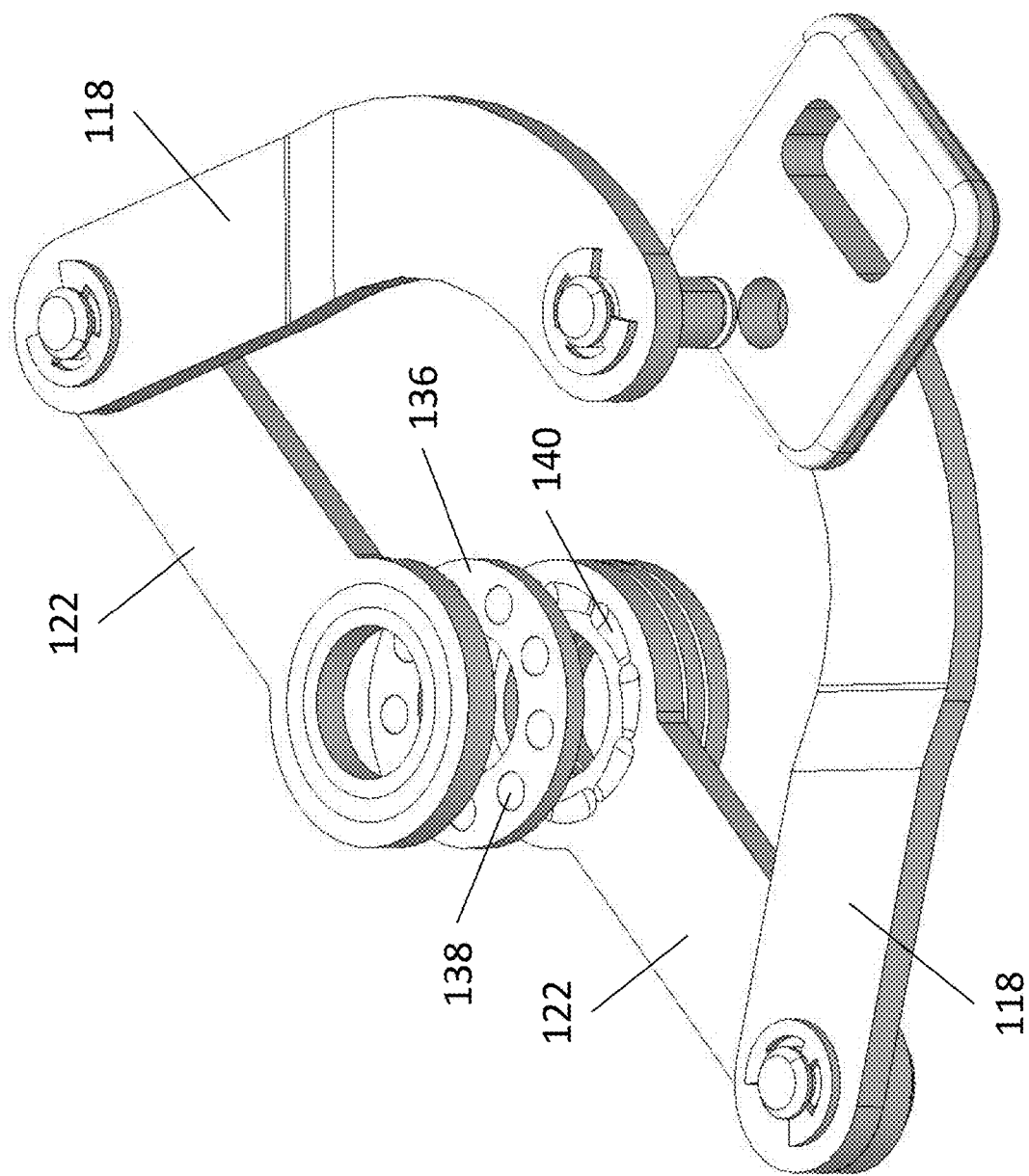
FIG. 4 depicts a partially exploded perspective view of exemplary ramped unlocking and locking mechanism components in isolation.
Figure 5:
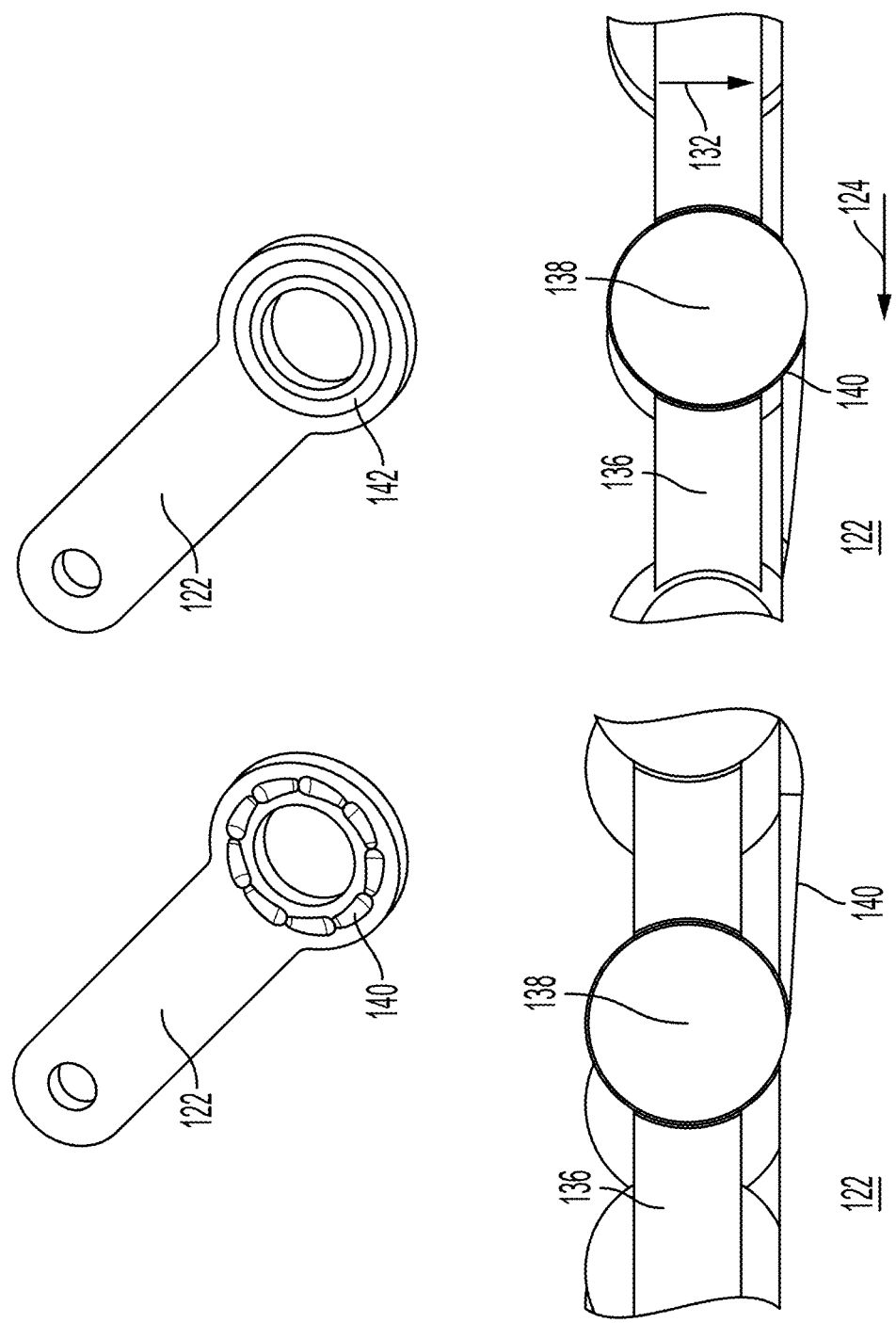
FIG. 5 depicts views of an exemplary ball bearing ramp (top) and side cross-sectional views of an exemplary ball bearing ramp engaging a rotary bearing (bottom).

Referring now to FIG. 4 and FIG. 5, a ramped engagement between a ball bearing ramp 122 and an adjacent bearing washer 136 is now described. As shown in FIG. 4, ball bearing ramps 122 may be stacked adjacent to one or more bearing washer 136. Each bearing washer 136 comprises a plurality of ball bearings 138 in a circular arrangement, as would be understood by persons having ordinary skill in the art. As shown in FIG. 5, each ball bearing ramp 122 comprises a plurality of ramps 140 embedded therein in a circular arrangement, such that each ramp 140 is matched to a ball bearing 138. Visible in the cross-sectional view in FIG. 5, bottom, each ramp 140 is sloped groove configured to guide a ball bearing 138 between a lowered position at the bottom of the slope and a raised position at the top of the slope. Rotation of ball bearing ramp 122 in a rotational direction 124 thereby induces movement in a vertical direction 132 in bearing washer 136 in a ramped manner. In certain embodiments, each ramp 140 can comprise one or more detents along its slope, such that a ball bearing 138 may temporarily seat within a detent. In some embodiments, each ramp 140 can comprise a detent at the lowered position and a detent at the raised position. In certain embodiments, rotation of ball bearing ramp 122 can exceed a length of ramp 140, such that a ball bearing 138 may exit ramp 140 at a raised position and rest on a flat surface of ball bearing ramp 122. In some embodiments, ball bearing ramp 122 can comprise a ring of ramps 140 on both a top side and a bottom side, such that bearing washers 136 adjacent to both the top side and bottom side may be vertically translated simultaneously. In some embodiments, ball bearing ramp 122 can comprise a level groove 142 on a side where vertical translation of an adjacent bearing washer 136 is not desired.

In various embodiments, articulated arm 100 can further comprise one or more features for enhancing a surgical operation. For example, in various embodiments, a ball joint connector 106 may be connected to a tool or instrument that may be locked in place in three-dimensional space and rapidly repositioned in three dimensional space. Contemplated tools or instruments include but are not limited to: fixing members securable to a bone or soft tissue, such as one or more screw, nail, pin, plate, K-wire, clamp, vice, strap, and the like; lighting instruments, imaging instruments, irrigation instruments, drilling instruments, aspiration instruments, and the like. In some embodiments, each articulated arm 100 may further comprise a sterile drape. In some embodiments, each articulated arm 100 may further comprise a holder for holding one or more additional instruments, including but not limited to endoscopes, laparoscopes, ultrasound probes, tubing, and the like.

In various embodiments, articulated arm 100 may further comprise one or more features for enhancing fabrication, machining, or tooling processes. For example, in various embodiments, ball join connector 106 may comprise a magnetic base for affixing articulated arm 100 to various metal surfaces of a lathe, end mill, router, CNC, and the like. In some embodiments, articulated arm 100 may comprise mounting locations for affixing measuring tools and instruments such as calipers, gage blocks, dial indicators, and the like, as would be used during calibration and measuring steps of fabrication, machining or tooling processes by one skilled in the art. In some embodiments, articulated arm may comprise mounting locations and/or clamps for affixing marking tools, instruments and/or components to be held in a stationary position during fabrication, machining and tooling processes. In some embodiments, articulated arm 100 may comprise embedded measurement tools such as, but not limited to, electronic dial indicators, analog dial indicators, calipers and the like for providing an accurate placement and positioning of articulated arm 100. In some embodiments, articulated arm 100 may comprise embedded sensors such as, but not limited to, accelerometers, gyrometers, inertial measurement units (IMUs), hall-effect sensors, rotary encoder sensors, pressure sensors, limit switches, proximity sensors and the like for accurate placement, positioning and orientation of articulated arm 100 in three-dimensional space. In some embodiments, articulated arm 100 may comprise damping components and/or materials to reduce or eliminate movement and vibration from translating through the device.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present invention and practice the claimed methods. The following working examples therefore, specifically point out exemplary embodiments of the present invention, and are not to be construed as limiting in any way the remainder of the disclosure.

Example 1: Prototype Testing

Figure 6:
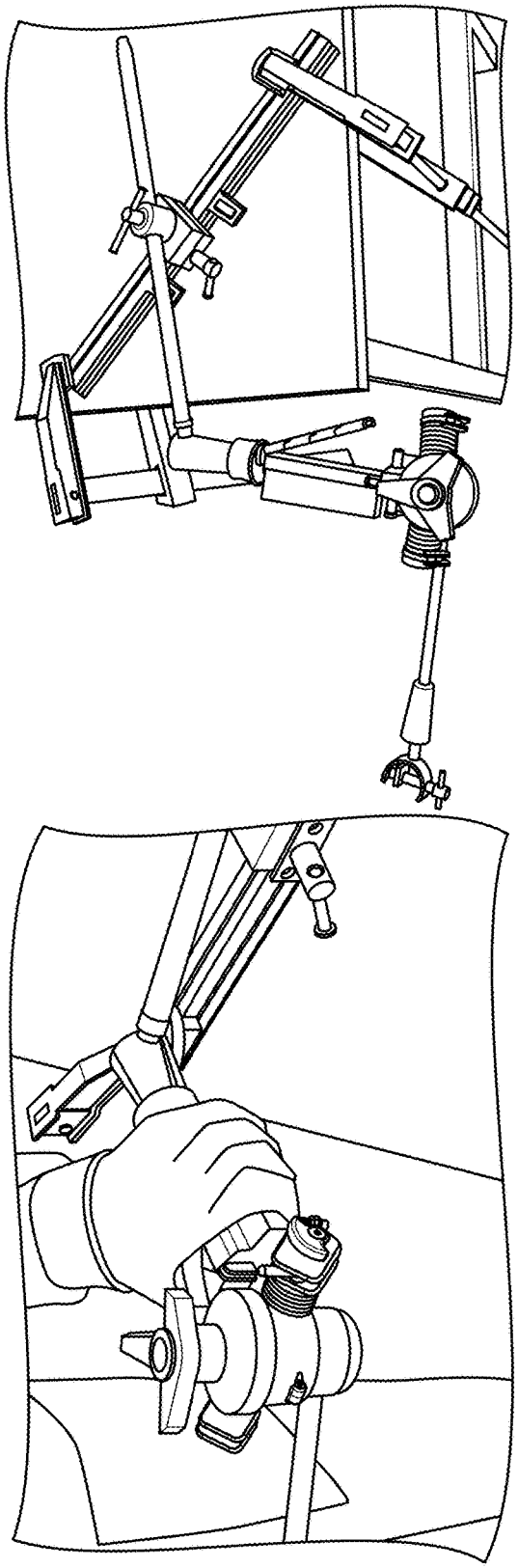
FIG. 6 depicts the results of joint load testing in an exemplary articulated arm and ramped unlocking and locking mechanism.

Joint load testing was performed on an articulated arm (FIG. 6) comparing the amount of force needed to actuate the lever of the ramped unlocking and locking mechanism relative to the amount of force needed to move the hinge or ball joints. The table in FIG. 6 lists the test parameters, where the articulated arm was first locked by screwing in the knob with 60 in-lbf torque. Joint 2 refers to the ball joint closest to the base connector on the table. Joint 3 refers to the hinge. In the first column, it was calculated that squeezing the lever with a 20.58 lbf would enable both joints to be moved with a force in excess of 17 lbf. Spec refers to adjustments that can be made to lever resistance on a per-user basis; for example a woman in the 2.5 percentile of strength is able to apply 58.7 pounds of force while performing a squeeze grip for 1-5 seconds. Required lever squeeze force can be reduced by 15% for persons over the age of 50, and required lever squeeze force can be reduced by 50% for continued use circumstances to reduce long term fatigue.

The second and third columns represent two trials, where a 37 lbf and a 39.6 lbf squeeze force was applied to the lever, respectively. In the first trial, squeezing the lever enabled joint 2 to be moved with a force in excess of 20 lbf and enabled joint 3 to be moved with a force of about 18 lbf. In the second trial, measurements were variable, so the 16.49 lbf necessary to move joint 2 represents an average of 5 readings (15.74 lbf, 14.12 lbf, 19.74 lbf, 16.84 lbf, and 16.02 lbf). In the second trial, the connection to the base connector on the table slipped, indicating that the force needed to move joint 3 may exceed 23.8 lbf.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. An articulated arm device, comprising:
   a first arm connected to a ball joint at a first end and a central hinge at a second end, wherein the central hinge rotates about a hinge pin, wherein the hinge pin comprises at least one hinge brake movable along the hinge pin, at least one ball bearing ramp rotatable about the hinge pin, and at least one bearing washer movable along the hinge pin;
   a second arm connected to a ball joint at a first end and the central hinge at a second end;
   a knob configured to lock and unlock the central hinge; and
   a ramped unlocking and locking mechanism connected to the central hinge;
   wherein the ramped unlocking and locking mechanism is configured to toggle between an unlocked and a locked position of the central hinge in a ramped manner.

2. The device of claim 1, wherein the knob is configured to simultaneously lock and unlock the central hinge, the ball joint of the first arm, and the ball joint of the second arm.

3. The device of claim 1, wherein the ramped unlocking and locking mechanism is configured to unlock and lock the central hinge, the ball joint of the first arm, and the ball joint of the second arm in a ramped manner.

4. The device of claim 1, wherein the ramped unlocking and locking mechanism comprises an actuatable member mechanically linked to the at least one ball bearing ramp, such that actuating the actuatable member proportionally rotates the at least one ball bearing ramp.

5. The device of claim 1, wherein the at least one ball bearing ramp comprises a circular arrangement of ramps, each ramp formed by a sloped groove having a lowered position at a bottom of the sloped groove and a raised position at the top of the sloped groove.

6. The device of claim 5, wherein the at least one bearing washer comprises a circular arrangement of ball bearings, each ball bearing matched to a ramp of the at least one ball bearing ramp.

7. The device of claim 6, wherein rotation of the at least one ball bearing ramp is configured to guide a ball bearing between the lowered position at the bottom of the sloped groove and the raised position at the top of the sloped groove in a ramped manner, thereby moving the at least one bearing washer along the hinge pin in a ramped manner.

8. The device of claim 7, wherein the movement of the at least one bearing washer along the hinge pin in a ramped manner also moves the at least one hinge brake along the hinge pin in a ramped manner, such that the central hinge is locked and unlocked in a ramped manner.

9. The device of claim 7, wherein the movement of the at least one bearing washer along the hinge pin in a ramped manner also moves the at least one ball joint brake along the hinge pin in a ramped manner, such that the ball joint of a respective arm is locked and unlocked in a ramped manner.

10. The device of claim 1, wherein the ramped unlocking and locking mechanism comprises a return mechanism configured to apply a spring force biased to return the ramped unlocking and locking mechanism to a locked or unlocked configuration.

11. The device of claim 3, wherein locking the central hinge, the ball joint of the first arm, and the ball joint of the second arm locks the articulated arm device in place in three-dimensional space.

12. The device of claim 2, wherein the ramped unlocking and locking mechanism is configured to lock and unlock the central hinge, the ball joint of the first arm, and the ball joint of the second arm in a ramped manner.

13. The device of claim 2, wherein the ramped unlocking and locking mechanism is configured to toggle between unlocking and relocking the central hinge, the ball joint of the first arm, and the ball joint of the second arm in a ramped manner and locking and unlocking the central hinge, the ball joint of the first arm, and the ball joint of the second arm in a ramped manner.

14. The device of claim 1, wherein the device comprises one or more sensors for accurate positioning, placement and/or orientation of the arm in three-dimensional space.

15. An articulated arm device, comprising:
    a first arm connected to a ball joint at a first end and a central hinge at a second end;
    a second arm connected to a ball joint at a first end and the central hinge at a second end;
    a knob configured to lock and unlock the central hinge; and
    a ramped unlocking and locking mechanism connected to the central hinge comprising a return mechanism configured to apply a spring force biased to return the ramped unlocking and locking mechanism to a locked or unlocked configuration, wherein the return mechanism comprises an adjustment member configured to adjust a spring force level, and wherein the ramped unlocking and locking mechanism is configured to toggle between an unlocked and a locked position of the central hinge in a ramped manner.

* * * * *